Jan. 5, 1932. T. VAN TUYL 1,839,279
CONNECTING DEVICE
Filed March 14, 1929
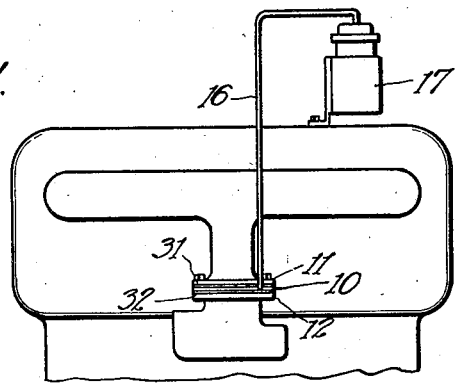
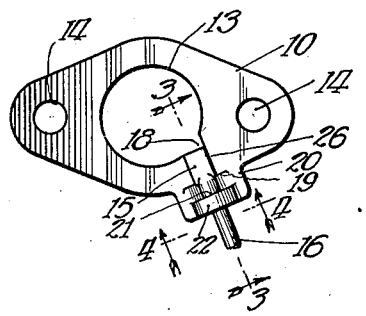
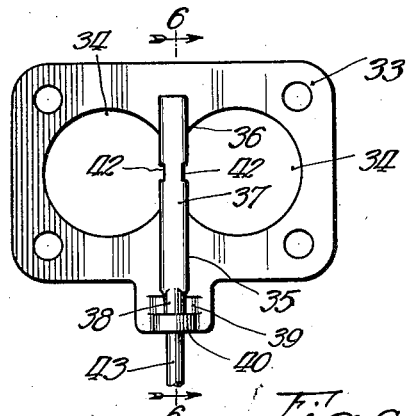
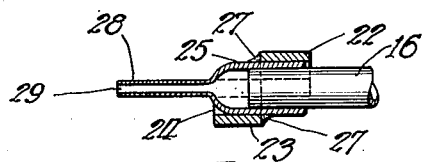
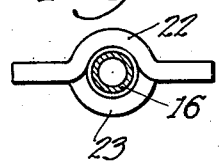
Inventor
Thomas Van Tuyl.
By: Roland C Lehm Atty Patented Jan. 5, 1932

1,839,279

UNITED STATES PATENT OFFICE

THOMAS VAN TUYL, OF OAK PARK, ILLINOIS, ASSIGNOR TO JAY MANUFACTURING COMPANY, A CORPORATION OF ILLINOIS

CONNECTING DEVICE

Application filed March 14, 1929. Serial No. 346,881.

This invention relates to pipe or tube connections, and aims to provide a device by which a tube or the like may be easily and conveniently connected to another tube or pipe.

The invention may be readily understood by reference to an illustrative construction embodying the invention and shown in the accompanying drawings.

In said drawings:

Fig. 1 is an elevation, in more or less diagrammatic form, of an internal combustion engine to which the illustrative device is applied;

Fig. 2 is a plan view of the connecting device;

Fig. 3 is a section of the detail thereof taken on the line 3—3 of Fig. 2;

Fig. 4 is a view of another detail taken along the line 4—4 of Fig. 2;

Fig. 5 is a plan view of a connecting device illustrating how the invention may be applied to a twin passage construction,—employed, for example, in connection with double throated or double carbureters;

Fig. 6 is a section taken along the line 6—6 of Fig. 5.

As shown in the drawings, the invention is embodied for illustration, in a device for making a connection with the suction manifold of an internal combustion engine. Devices of this character are particularly advantageous where the suction manifold is not provided with means for making a suction connection (as is the case in some constructions) or where the design is such that a connection cannot be made at the joint between the manifold and carbureter, by existing means.

The illustrative device embodies an insert 10 in this case of gasket form designed to be placed between the usual flanged coupling members 11 and 12 of the intake manifold and carbureter. Such an insert is shaped to correspond with said flanged coupling members and is provided with an opening 13 corresponding to the communicating carbureter and manifold passages and bolt holes 14 corresponding in position and number to those in the coupling flanges. The insert 10 is advantageously made of sheet brass, in this case about one-sixteenth of an inch ($\frac{1}{16}''$) thick, a thickness which permits the application of the insert without requiring any substantially greater separation than normal, between the flanges 11 and 12. Communicating with the opening 13 is a conduit member 15 of the same thickness as the insert, with which is associated a tube or pipe 16 leading to whatever device or devices it is desired to connect with the engine suction. In the present instance I have illustrated the tube 16 as being connected with a lubricator 17 designed to supply regular but minute quantities of lubricant to the upper cylinder walls and valves, through the intake manifold.

In the present instance the conduit member is inserted in a transversely extending recess in the insert, in this case represented by the open slot 18. This slot extends to a point 19 corresponding with the normal outline of the insert. This insert is provided with means for firmly connecting together the portions thereof on opposite sides of the slot to prevent widening of the slot or distortion of the insert. In this case such means are provided on a projection 20 extending beyond the slot at the point 19, in the form of bridging or connecting members 22 and 23, which are herein shown as integral with the insert and formed by slitting the projection at 21 and oppositely arching or stretching the members 22 and 23 to provide a passage 24 in line with the slot 18 through which the cylindrical extremity 25 of the conduit may extend. The conduit member may advantageously be assembled with the insert in the following manner: The conduit member, initially a piece of ordinary tubing, is inserted through the opening 24 into the slot 18 and in such position is flattened to the exact thickness of the insert 10 by an appropriate press. The action of the press serves not only to shape the conduit member so that its surfaces will be flush with the insert but presses the side edges of the conduit into close engagement throughout, with the side edges 26 of the slot 18. The tendency of the slot to open up during this operation (and thereby distort the insert or to destroy its surface continuity) is prevented by the connecting members 22 and 23 which are preferably arched to fit closely around the conduit and thereby to be supported against flattening under forces tending to widen the slot. The conduit is advantageously soldered or brazed as at 27 to the bridging strips 22 and 23 and is advantageously made of brass (as distinguished from copper) to provide thinner walls 28 (of adequate strength) than those of other types of tubing, thereby permitting a conduit passage 29 of maximum cross section. The brass tubing may advantageously extend only to the edge of the insert and there be connected with the tube 16 which may be an ordinary copper or other tube whose extremity is inserted inside and soldered or brazed to the brass conduit.

The slot is adjusted in width, and the tube 15 in diameter, to suit the desired area of the passage 29, which is not, therefore, practically limited in effective size by the thinness of the insert.

The above described pressing action by which the conduit member 15 is forced to conform with the dimensions in the slot 18 produces flush and continuous upper and lower surfaces to the insert member, thereby eliminating any opportunity for leakage between the insert and the upper and lower sealing means 31 and 32 which may be thin gaskets or layers of plastic sealing material, or both. Such sealing layers may advantageously comprise a coating of so-called insulating varnish which remains slightly soft and flexible and never becomes hard or brittle. To the varnish coating (which is applied to the surfaces of the insert) is applied a coating of soapstone or graphite which renders the varnish coating non-adhesive to prevent sticking to any surface with which it comes in contact and makes it possible to supply the inserts already coated. Such coating also contributes to the sealing qualities of the sealing layers.

The above described construction permits the connection of a suction tube with the intake manifold in constructions which are not provided with the usual fitting tapped into the intake manifold. The relatively thin gauge of the insert permits its application to constructions wherein the carbureter cannot conveniently be lowered or separated from the flange 11 by a distance greater than that ordinarily allowed for a gasket, yet it is of adequate strength and provides a suction passage whose effective size is not limited by the thinness of the insert.

In Figs. 5 and 6 is illustrated the application of the invention to a carbureter and intake manifold having twin passages associated with a double throated or double carbureter. In this instance the sheet brass insert 33 (corresponding in shape to the coupling flanges) is provided with twin openings 34 registering with the carbureter and manifold passages. In line with the division between the passages, the insert is slotted as at 35 and 36 to receive the flattened conduit member 37 whose cylindrical extremity 38 projects between bridging or connecting strips 39 and 40, similar in construction and function to the members 22 and 23. The conduit member 37 is advantageously assembled with the insert 33 in the same manner as described in connection with the construction shown in Fig. 2, namely, the tube is flattened under a confining pressure so as to conform exactly with the slots 35 and 36 and to provide flush and continuous surfaces for the insert. The interior passage 41 of the conduit is made to communicate with the twin openings 34 by notches or recesses 42 cut into the side edges of the flattened tube. These notches should be large enough to provide openings at least aggregating the cross section of the passage 41.

The brass conduit advantageously terminates at the edge of the insert and a copper or other tube 43 is connected thereto in the same manner as described in connection with the construction of Fig. 2.

Obviously the invention is not limited to the details of the illustrative device since these may be variously modified. Moreover, it is not indispensable that all features of the invention be used conjointly since certain features may be advantageously employed in various different combinations and subcombinations.

Having described an embodiment of my invention, I claim:

1. A device of the character described comprising in combination a metal gasket-like insert of relatively thin gauge and of sufficient area to provide portions extending beyond the gasket area of said insert, said insert having an opening therethrough and being cut away to provide an open slot extending from said opening toward the edge of said insert, integral portions of said insert in line with said slot being oppositely offset to provide a clear slot passage, a flat surfaced tube tightly fitting in said slot and having its surfaces flush with those of the insert to provide continuous gasket surfaces, said offset portions of said insert extending over opposite sides of said tube to serve as bridge pieces for preventing the spreading of the sides of said slot, said offset portions lying in the portion of said insert outside of the gasket area.

2. The method of making a gasket-like insert having a connecting passage, which is characterized by forming an open slot in said insert extending from the gasket opening toward the side of the insert, then flattening the sides of a tube in said slot so as completely to fill the latter and to bring the outer surfaces of said tube flush with those of the insert and simultaneously preventing a widening of said slot during the flattening of said tube.

3. A device of the character described, comprising in combination a gasket-like insert of relatively thin gauge formed with an opening and being cut away to form a slot extending from said opening toward the edge of the insert, a flat sided tube equal in thickness to that of said insert and fitting tightly in said slot to provide continuous flush upper and lower gasket surfaces for said insert, and a bridge piece extending across said tube from one side to the other of said slot to prevent the spreading of said slot, said bridge piece being located outside the area comprising the gasket surfaces.

4. A device of the character described, comprising in combination a gasket-like insert of relatively thin gauge formed with an opening and being cut away to form a slot extending from said opening toward the edge of the insert, a flat sided tube equal in thickness to that of said insert and fitting tightly in said slot to provide continuous flush upper and lower gasket surfaces for said insert, and a portion of said insert lying in line with said slot being offset to provide a bridge piece across said tube to prevent the spreading of said slot, said bridge piece being located outside the area comprising the gasket surfaces, the gasket surfaces being coated with a non-adhesive sealing material.

In testimony whereof, I have signed my name to this specification.

THOMAS VAN TUYL.